United States Patent Office 3,376,325
Patented Apr. 2, 1968

3,376,325
5β,6β-METHANOESTRANES
John S. Tadanier, Chicago, Ill., assignor to Abbott Laboratories, Chicago, Ill., a corporation of Illinois
No Drawing. Continuation-in-part of application Ser. No. 436,639, Mar. 2, 1965. This application Apr. 6, 1965, Ser. No. 446,122
4 Claims. (Cl. 260—397.4)

ABSTRACT OF THE DISCLOSURE

3β - methoxy - 10β - hydroxy - 5β,6β - methanoestranes with various substituents in the 17-position are described. The new compounds are useful androgens and growth-regulating agents for warm-blooded animals.

This application is a continuation-in-part of U.S. patent application Ser. No. 436,639, filed Mar. 2, 1965, now U.S. Patent 3,277,125.

The present invention is directed to 17-substituted 3β-methoxy-5β,6β-methanoestranes which carry at the 10-position a double-bond connecting to the 9-position or a hydroxy group. The present invention is also directed to an ice-cooled reaction solution containing a compound of the formula

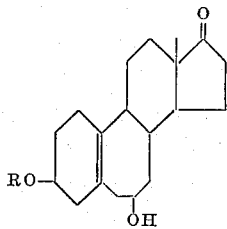

wherein R is lower alkyl or a lower fatty acid acyl group, and an organic sulfonyl chloride of the formula R'SO₂Cl wherein R' is lower alkyl, phenyl, or tolyl. Such a solution is of great importance in the manufacture of compounds carrying at the 10-position various substituents or a double-bond, e.g. the solution is used in the preparation of the compounds of formulae

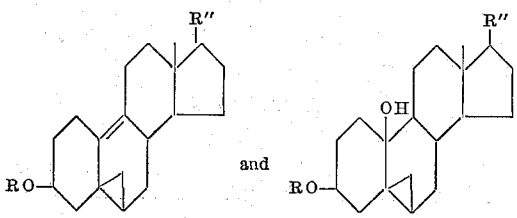

wherein R has the above meaning and R″ is oxygen, acyloxy, or hydroxy. These new compounds are useful androgens and are growth-regulating agents when administered to warm-blooded animals.

The intermediate solution is prepared by dissolving the 3β - substituted 7β - hydroxy - B - homoestr - 5(10) - en-17-one and 1–5 molar equivalents of the above sulfonyl chloride in pyridine at a temperature between −40° C. and 0° C. to form a solution of between 5 and 20% concentration. Upon warming this solution to room temperature or above, 3,17-disubstituted 5β,6β-methanoestr-9-ene forms; when water is added to the solution before allowing it to warm, the corresponding 10β-hydroxy-5β,6β-methanoestrane is formed; when ammonia is added to the solution, the corresponding 10β-amino compound is obtained; similarly, when an alcohol is added, the corresponding 10β-alkoxy compound forms; etc. The ice-cooled solution is thus a very valuable intermediate in the preparation of compounds of the 5β,6β-methanoestrane series carrying a variety of substituents in the 10β-position.

In a simple embodiment, 1 part of 7β-hydroxy-3β-methoxy-B-homoestr-5(10)-en-17-one (described in Tetrahedron Letters, No. 21, pp. 1345–52) is dissolved in 5–20 parts by weight of pyridine. This solution is cooled to a temperature below 0° C. and 1–5 molar equivalents of methanesulfonyl chloride is added under ice-cooling and stirring. The solution is then permitted to stand at room temperature for at least 15 minutes to form the 3β-methoxy-5β,6β-methanoestr-9-en-17-one. When the solution is diluted with water before allowing it to warm to room temperature, 10β - hydroxy-3β-methoxy-5β,6β-methanoestran-17-one forms which can easily be isolated from the reaction mixture. In both of these compounds, the 17-oxo group can be reduced to the 17β-hydroxy group with sodium borohydride in an alcoholic solution. The latter compounds can be esterified at 17 in the usual manner to form the corresponding 17β-acyloxy compounds.

In order to illustrate the process of the present invention, reference is made to the following examples which are not meant to limit the invention. Wherever these examples refer to solvent mixtures without naming the ratio thereof, it is to be understood that the first-named solvent is used to dissolve the solid material and the other solvent is added after concentrating the solution to induce or to complete crystallization of the solid.

EXAMPLE 1

3β-methoxy-5β,6β-methanoestr-9-en-17-one

A solution of 403 mg. of 7β-hydroxy-3β-methoxy-B-homoestr-5(10)-en-17-one in 8 ml. of pyridine is cooled in an ice bath and 0.42 ml. of methanesulfonyl chloride is added to the stirred solution. Stirring is continued under cooling for 10 minutes and the resulting solution is then allowed to stand at room temperature for 3 hours. The reaction mixture is shaken with a mixture of 100 ml. of ether and 80 ml. of water. The aqueous phase is separated and washed with two 80-ml. portions of ether. The ether solutions are washed in series with 50 ml. of water, 50 ml. of 5% sodium bicarbonate solution, and three 50-ml. portions of water. Finally, the ether solutions are combined and dried over anhydrous magnesium sulfate. The ether is evaporated and the residual pyridine is removed by azeotropic distillation with benzene under reduced pressure, leaving 340 mg. of a yellow solid.

A solution of the above yellow solid in benzene is placed on a column of 14 grams of neutral, activity III alumina and eluted with 50 ml. of benzene to yield 247 mg. of a white solid. Three recrystallizations from ether/pentane solutions yield 107.1 mg. of 3β-methoxy-5β,6β-methanoestr-9-en-17-one melting at 119-122° C.; $[\alpha]_D^{24}+93°$ (chloroform). The new compound is further characterized by the absence of the vinyl proton absorption in the nuclear magnetic resonance spectrum. The analytical values of the new compound are in good agreement with the empirical formula $C_{20}H_{28}O_2$.

A second crop of 60 mg. of the material with a melting point of 117–122° C. is obtained from the above mother liquors.

When in the above example the methane sulfonyl chloride is replaced by an equimolar amount of toluene sulfonyl chloride, substantially the same result is obtained.

EXAMPLE 2

17β-hydroxy-3β-methoxy-5β,6β methanoestr-9-ene

A solution of 30 mg. of 3β-methoxy-5β,6β-methanoestr-9-en-17-one in 3 ml. of methanol and a freshly prepared solution of 120 mg. of sodium borohydride in 2 ml. of methanol are combined at room temperature. After 30 minutes, the solution is poured into water and the mixture is extracted with ether. The ether phase is washed with water, and dried over anhydrous magnesium sulfate. Evaporation of the ether leaves 17β-hydroxy-3β-methoxy-5β,6β-methanoestr-9-ene which is purified by recrystallization from ether/pentane. The analytical values are in good agreement with the empirical formula $C_{20}H_{30}O_2$.

EXAMPLE 3

17β-acetoxy-3β-methoxy-5β,6β-methanoestr-9-ene

A solution of 20 mg. of the product of Example 2 in 2 ml. of pyridine is treated with 0.3 ml. of acetic anhydride. The solution is allowed to stand for 6 hours at room temperature and is then poured into water. The aqueous mixture is extracted with ether and the ether solution is washed with water and dried over anhydrous magnesium sulfate. Evaporation of the solvent leaves 17β - acetoxy-3β-methoxy-5β,6β-methanoestr-9-ene. The analytical values obtained after recrystallization from ether/pentane are in good agreement with those calculated for the empirical formula $C_{22}H_{32}O_3$.

EXAMPLE 4

10β-hydroxy-3β-methoxy-5β,6β-methanoestr-17-one

In a repetition of Example 1 but using 549 mg. of the steroidal starting material, 11 ml. of pyridine and 0.57 ml. of methanesulfonyl chloride, and adding 1.1 ml. of water after the mixture is stirred 10 minutes at 0° C., the work-up procedure described above produces only a small amount of 3β-methoxy-5β,6β-methanoestr-9-en-17-one as an oil which crystallizes upon standing.

Upon subsequent elution of the chromatographic column with ether/benzene 1:1, 126.2 mg. of a colorless oil is obtained. This material is rechromatographed on 20 grams of neutral, activity III alumina. Elution with 160 ml. of ether/benzene 1:15 yields 116 mg. of a white, crystalline solid which upon recrystallization from ether/pentane produces pure 10β-hydroxy-3β-methoxy-5β,6β-methonaestr-17-one melting at 129–134° and showing an infrared absorption maximum at 3067 cm.$^{-1}$. The analytical values are in good agreement with those calculated from the empirical formula $C_{20}H_{30}O_3$.

By replacing the methanesulfonyl chloride used above with an equimolar amount of benzene sulfonyl chloride, substantially the same result is obtained.

EXAMPLE 5

10β,17β-dihydroxy-3β-methoxy-5β,6β-methanoestrane

By using 10β-hydroxy-3β-methoxy-5β,6β-methanoestr-17-one as the starting material for the process described in Example 2 above, 10β,17β-dihydroxy-3β-methoxy-5β,6β-methanoestrane is obtained. The analytical values of the purified compound are in good agreement with those calculated from the empirical formula $C_{20}H_{32}O_3$.

EXAMPLE 6

17β-acetoxy-10β-hydroxy-3β-methoxy-5β,6β-methanoestrane

By repeating the process of Example 3 but using as the starting material the compound of Example 5, 17β-acetoxy-10β-hydroxy-3β-methoxy-5β,6β-methanoestrane is obtained. The analytical values of the recrystallized compound are in good agreement with the values calculated from the empirical formula $C_{22}H_{34}O_4$.

When the acetic anhydride is replaced with propionic anhydride, the corresponding 17β-propionoxy analog is obtained.

It will be apparent to those skilled in the art that the process exemplified above can be carried out equally well with starting materials carrying at the 3-position an alkoxy group with a chain-length greater than the methoxy group referred to above. Also, it will be apparent that the starting material may carry a 3β-acyloxy group since none of the above procedures will affect such a substituent. For instance, when using 7β-hydroxy-3β-propionoxy-B-homo-estr-5(10)-en-17-one as the starting material, 3β-propionoxy-5β,6β-methanoestr-9-en-17-one and 10β-hydroxy-3β-propionoxy-5β,6β-methanoestr-17-one are obtained by following the procedure of Example 4. The corresponding 17β-hydroxy- and 17β-acyloxy compounds are obtained by the methods described above, and the corresponding 3β-hydroxy analogs are attained by known hydrolysis methods.

Others may practice the invention in any of the numerous ways which will be suggested to one skilled in the art by the present disclosure. All such practice of the invention is considered a part hereof provided it falls within the scope of the appended claims.

I claim:

1. A compound of the formula

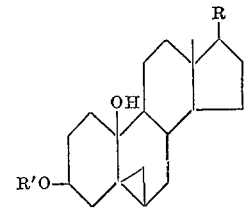

wherein R is selected from the group consisting of hydroxy, oxo, and lower fatty acid acyloxy, and wherein R' is selected from the group consisting of lower alkyl and lower fatty acid acyl.

2. 10β - hydroxy - 3β - methoxy - 5β,6β-methanoestr-17-one.

3. 10β,17β - dihydroxy - 3β - methoxy - 5β, 6β - methanoestrane.

4. 17β - acetoxy - 10β - hydroxy - 3β - methoxy - 5β,6β-methanoestrane.

References Cited

UNITED STATES PATENTS 3,277,125  10/1966  Tadanier _____ 260—397.4
3,328,434  6/1967  Knox et al. _____ 260—397.4

LEWIS GOTTS, *Primary Examiner.*

H. FRENCH, *Assistant Examiner.*